United States Patent
Ramesh

(10) Patent No.: US 7,144,966 B2
(45) Date of Patent: Dec. 5, 2006

(54) ACRYLIC COMPOSITION FOR USE IN COATING APPLICATIONS AND A METHOD OF FORMING THE SAME

(75) Inventor: Swaminathan Ramesh, Canton, MI (US)

(73) Assignee: BASF Corporation, Southfield, MI (US)

( * ) Notice: Subject to any disclaimer, the term of this patent is extended or adjusted under 35 U.S.C. 154(b) by 137 days.

(21) Appl. No.: 10/793,528

(22) Filed: Mar. 4, 2004

(65) Prior Publication Data

US 2005/0197472 A1  Sep. 8, 2005

(51) Int. Cl.
*C08F 8/00* (2006.01)
*C08F 118/02* (2006.01)

(52) U.S. Cl. ............... 526/319; 526/346; 526/347; 526/230; 526/303.1; 526/341

(58) Field of Classification Search ......... 526/319, 526/346, 347, 230, 303.1, 341
See application file for complete search history.

(56) References Cited

U.S. PATENT DOCUMENTS 6,462,144 B1 * 10/2002 Ramesh et al. ............. 525/438

FOREIGN PATENT DOCUMENTS

| WO | WO00/12566 | 3/2000 |
|---|---|---|
| WO | WO00/12567 | 3/2000 |

OTHER PUBLICATIONS

John F. Quinn, et al. Australian Publication entitled "Facile Synthesis of Comb, Star and Graft Polymers Via Reversible Addition—Fragmentation Chain Transfer (RAFT) Polymerization", Jan. 5, 2002.

* cited by examiner

*Primary Examiner*—Robert D. Harlan

(57) ABSTRACT

An acrylic composition is formed by reacting a functionalized, chain-stopping monomer, a first compound, and a highly-branched, polyfunctional core molecule. The first compound includes vinyl functionality and at least one other functionality that is different from the vinyl functionality, such as epoxy functionality. The first compound, specifically the vinyl functionality of the first compound, reacts with the monomer to form a functionalized intermediate, and the core molecule reacts with this functionalized intermediate to form the acrylic composition.

33 Claims, No Drawings

ACRYLIC COMPOSITION FOR USE IN COATING APPLICATIONS AND A METHOD OF FORMING THE SAME

FIELD OF THE INVENTION

The present invention generally relates to an acrylic composition for use in coating applications and a method of forming the acrylic composition. More particularly, the present invention relates to an acrylic composition that can be incorporated into a coating composition and then used in coating applications, such as an automotive coating application, to produce films that have suitable scratch, mar, and chip performance.

BACKGROUND OF THE INVENTION

Acrylic compositions and their use in a wide variety of coating applications are known in the art. In a coating composition, acrylic compositions, along with a suitable cross-linking agent, generally produce a film having good film properties, such as resistance to scratch, mar, and chip. Coating compositions that utilize acrylic compositions typically require solvents to dissolve or otherwise reduce the acrylic composition for processing and application purposes. Solvents are required primarily due to a high molecular weight and a correspondingly high viscosity for the acrylic composition.

It is known that there is a movement toward utilizing acrylic compositions that have lower molecular weights so as to reduce the overall amount of solvents, i.e., volatile organic compounds (VOCs), required in the coating composition. However, it is also known that coating compositions that utilize acrylic compositions with lower molecular weights produce films that have poorer film properties as evidence by decreased scratch, mar, and chip performance.

Highly branched, e.g. star, compositions are being utilized more frequently because they offer higher molecular weights yet they exhibit low viscosity, as compared to the viscosity of conventional acrylic compositions, i.e., acrylic compositions that are not highly branched. These highly branched compositions have, to date, primarily been polyester-based. However, some highly branched acrylic compositions have been developed by complex methods such as Atom Transfer Radical Polymerization (ATRP) and Reversible Addition-Fragmentation Chain Transfer (RAFT) Polymerization. These methods are complex, and are therefore generally undesirable, for a variety of reasons including, but not limited to, slow reaction times, poor manufacturability, and a requirement for post purification of the acrylic composition.

Due to the inadequacies associated with the acrylic compositions of the prior art, especially the highly branched acrylic compositions developed by ATRP and RAFT, it is desirable to provide a new and unique acrylic composition and a relatively non-complex method to form the acrylic composition.

SUMMARY OF THE INVENTION AND ADVANTAGES

An acrylic composition, or star acrylic polymer, for use in a coating composition and a method of forming the acrylic composition are disclosed. The acrylic composition comprises the reaction product of a functionalized, chain-stopping monomer, a first compound, and a highly-branched, polyfunctional core molecule. The first compound, which includes vinyl functionality and at least one other functionality that is different from the vinyl functionality, is reactive with the functionalized, chain-stopping monomer to form a functionalized intermediate. More specifically, the vinyl functionality of the first compound reacts with the functionalized, chain-stopping monomer and the core molecule is reactive with the functionalized intermediate to form the acrylic composition. The method includes the steps of reacting the functionalized, chain-stopping monomer and the first compound to form the functionalized intermediate, and reacting the core molecule with the functionalized intermediate to form the acrylic composition.

A method of forming the star acrylic polymer, more specifically a star polymer having a core and a plurality of functionalized acrylate branches, is also disclosed. In this method, the core of the star polymer is equivalent to the core molecule and the functionalized acrylate branches are equivalent to the functionalized intermediate. The functionalized acrylate branches are formed and then the core is polymerized with the functionalized acrylate branches. This method, as well as the method of forming the acrylic composition as generically outlined above, provide new techniques by which to form acrylic compositions which are relatively non-complex when compared to other methods for providing highly branched acrylic compositions, such as ATRP and RAFT. Furthermore, the acrylic compositions formed herein, in combination with a suitable cross-linking agent, produce films, especially clearcoat films, that have suitable scratch, mar, and chip performance.

DETAILED DESCRIPTION OF THE INVENTION

The acrylic composition of the present invention, also referred to in the art as a star acrylic polymer or a star polymer having a core and a plurality of functionalized acrylate branches (also referred to as chains, arms, appendages, and the like), is used in a coating composition, preferably in conjunction with a suitable cross-linking agent, to produce a film for coating a substrate, such as the body panels of a vehicle and the like. The acrylic composition is formed via a free-radical, acrylic polymerization method that is described additionally below. More specifically, the acrylic composition is the reaction product of a functionalized, chain-stopping monomer, a first compound, and a highly-branched, polyfunctional core molecule. The highly-branched, polyfunctional core molecule, hereinafter simply referred to as the core molecule, functions as the core of the star polymer. The first compound and the core molecule are described additionally below.

Preferably, the functionalized, chain-stopping monomer, hereinafter simply referred to as the monomer, includes a first functionality and a second functionality. For descriptive purposes only, the first functionality of the monomer is referred to as a first monomer functionality and the second functionality of the monomer is referred to as a second monomer functionality. The first monomer functionality is targeted at any functionality that is suitable for stopping chain growth during the free-radical, acrylic polymerization method and the second monomer functionality is targeted at any functionality that is suitable for reacting with functional groups introduced later via the core molecule. As will become evident below, the functional groups from the core molecule can vary. The first monomer functionality preferably includes vinyl functionality and the second monomer functionality preferably includes any functionality that is reactive with the functional groups present on the core molecule. For example, the second monomer functionality may include carboxylic acid functionality if the core molecule includes epoxy functional groups, or the second functionality of the monomer may include a hydroxyl-reactive functionality, i.e., a functionality that reacts with hydroxyl groups, if the core molecule included hydroxyl functional groups. One such hydroxyl-reactive functionality on the monomer is isocyanate functionality. Overall, it is to be understood that there are many different combinations of second functionalities for the monomer so long as the monomer still has the effect of stopping chain growth during the free-radical, acrylic polymerization method. In any event, the monomer is present in the acrylic composition in an amount of from 1 to 20, more preferably from 3 to 10, parts by weight based on 100 parts by weight of the acrylic composition.

In the most preferred embodiment of the present invention, the first monomer functionality includes vinyl functionality, i.e., a vinyl group, and the second monomer functionality includes aliphatic isocyanate functionality which can react with a core molecule that contains hydroxyl groups. One such most preferred monomer is α,α-dimethyl isopropenyl benzyl isocyanate which has both vinyl functionality and aliphatic isocyanate functionality as the hydroxyl-reactive functionality. α,α-dimethyl isopropenyl benzyl isocyanate is also known in the art as TMI® (Meta) Unsaturated Aliphatic Isocyanate and is commercially available from Cytec Industries. α,α-dimethyl isopropenyl benzyl isocyanate is also referred to in the art as 3-isopropenyl-α,α-dimethylbenzyl isocyanate, and α,α-dimethyl meta-isopropenyl benzyl isocyanate. Furthermore, although less preferred, the Ortho and Para forms of α,α-dimethyl isopropenyl benzyl isocyanate are also feasible. For descriptive purposes, a chemical representation of α,α-dimethyl isopropenyl benzyl isocyanate is disclosed below.

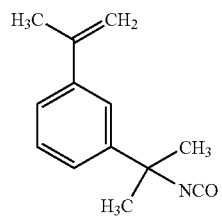

Other monomers are suitable as a reactant for the acrylic composition so long as the monomer is functionalized for subsequent reaction with the core molecule and has the ability to stop chain growth during the free-radical, acrylic polymerization method. In the preferred embodiment, where the monomer is α,α-dimethyl isopropenyl benzyl isocyanate, the monomer has the chain-stopping effect of limiting the number of —NCO groups under normal acrylic polymerization conditions.

Examples of other such monomers include, but are not limited to, functionalized styrene (preferably with substituents on the 2 and 6 positions), functionalized vinyltoluene, functionalized α-methylstyrene; functionalized diphenylethylene, functionalized dinapthalenethylene, and combinations thereof. The descriptive terminology 'functionalized' that precedes the monomers outlined above refers to any functionality that can react with the functionality from the core molecule. As one, non-limiting example, instead of the second functionality of the monomer being isocyanate functionality, it could be carboxylic acid functionality.

The first compound is reactive with the monomer to form a functionalized intermediate. The first compound includes vinyl functionality and at least one other functionality that is different from the vinyl functionality. More specifically, it is the vinyl functionality of the first compound that is reactive with the monomer.

Preferably, the at least one other functionality of the first compound is non-reactive with the monomer and non-reactive with the core molecule. That is, although not required, it is preferred that the at least one other functionality of the first compound is not capable of reacting with the monomer, especially not with the second functionality of the monomer, and is not capable of reacting with the core molecule. Furthermore, it is also preferred that the at least one other functionality of the first compound is epoxy functionality. However, epoxy functionality is not required. For instance, the at least one other functionality of the first compound could be hydroxyl and/or carboxylic acid functionality, especially when the second functionality of the monomer is a functionality other than isocyanate functionality.

Upon reaction, the first compound polymerizes with the monomer to form the functionalized intermediate. The functionalized intermediate of the present invention is formed by reacting the monomer and the first compound. To initiate this reaction, an initiator, also known in the art as a polymerization promoter, may be incorporated to initiate the free-radical, acrylic polymerization method. As understood by those skilled in the art, a wide variety of initiators may be used. However, it is preferred that the initiator is selected from the group of inorganic persulfates such as ammonium persulfate, $(NH_4)_2S_2O_8$, potassium persulfate, $K_2S_2O_8$, and sodium persulfate, $Na_2S_2O_8$, dialkyl peroxides such as di-tert-butyl peroxide and dicumyl peroxide, hydroperoxides such as cumene hydroperoxide and tert-butyl hydroperoxide, peresters such as tert-butyl peroctoate (TBPO), which is also known as tert-butyl peroxy-2-ethylhexanoate, tert-butyl perbenzoate, tert-butyl perpivalate, tert-butyl per-3,4,5,-trimethylhexanoate and tert-butyl per-2-ethylhexanoate, azo compounds, and combinations thereof. Suitable azo compounds include, but are not limited to, Vazo® 52, 64, 67 and the like. Vazo® 52, 64, 67 are, respectively, 2,2'-azobis(2,4-dimethylpentaneni 2,2'-azobis(2-methylpropanenitrile), and 2,2'-azobis(2-methylbutanenitrile). Inorganic peroxodisulfates and ammonium or alkali metal peroxydiphosphates can also be utilized to initiate the free-radical, acrylic polymerization method. Most preferably, the initiator is tert-butyl peroctoate.

In the preferred embodiment, the first compound is present in an amount of from 10 to 99, more preferably from 15 to 90, parts by weight based on 100 parts by weight of the acrylic composition. Furthermore, in the preferred embodiment, the first compound is selected from the group of acrylates having epoxy functionality in the alkyl chain, methacrylates having epoxy functionality in the alkyl chain, and combinations thereof. More preferably, the first compound is selected from the group of glycidyl acrylate, glycidyl methacrylate, and combinations thereof. The criteria for selecting the first compound is to select a compound that will polymerize with the monomer and that preferably has functionality that does not react with the second functionality of the monomer or the functionality of the core molecule under target reaction conditions. Thus, it is apparent that compounds other than glycidyl acrylate and glycidyl methacrylate may be suitable as the first compound so long as these other compounds satisfy the criteria outlined above. For example, the first compound may be any epoxy functional acrylate or methacrylate. Alternatively, as alluded to above, the first compound may be any acrylate or methacrylate including functional groups such as hydroxyl and/or carboxylic acid functionality. For descriptive purposes, a chemical representation of glycidyl methacrylate is disclosed below.

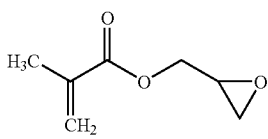

As stated above, the first compound is reactive with the monomer to form the functionalized intermediate. Assuming the monomer is α,α-dimethyl isopropenyl benzyl isocyanate and the first compound is glycidyl methacrylate, the functionalized intermediate disclosed below is formed, where INIT. represents the initiator and m ranges from 1 to 80, most preferably from 15 to 30. For a final acrylic composition (i.e., the acrylic composition after reaction with the core molecule) that would have a molecular weight, $M_w$, of 700 to 48,000, the functionalized intermediate disclosed below (which is also the functionalized acrylate branches) preferably has a molecular weight, $M_w$, itself of approximately 300 to 12,000, more preferably from 1,000 to 4,000. Of course, higher molecular weights, $M_w$, are possible for the acrylic composition, but such acrylic compositions are not ideal due to an excessive resultant viscosity. Acrylic compositions with excessive viscosity are not ideal for coating applications.

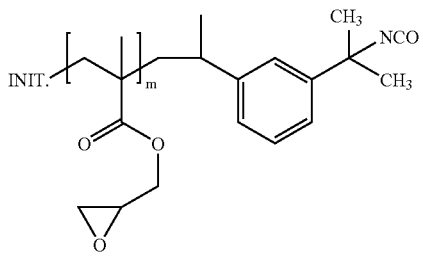

The functionalized intermediate disclosed above is equivalent to the functionalized acrylate branches of the star polymer. That is, this functionalized intermediate functions as the branches for subsequent connection to the core of the star polymer. The functionalized acrylate branches are formed first and the core, i.e., the core molecule, is then condensed with the functionalized acrylate branches.

The acrylic composition of the present invention preferably includes a second compound in addition to the first compound. The second compound reacts with the monomer and the first compound to form the functionalized intermediate. Thus, if the second compound is included, then the second compound copolymerizes with the first compound and the chain is stopped by the monomer which will then be reacted with the core molecule.

Although not required, it is preferred that the second compound include vinyl functionality. As such, in this preferred embodiment, the second compound is selected from the group of acrylates, methacrylates, acrylonitrile or acrylonitriles, styrene or styrenes, and combinations thereof. Furthermore, in other embodiments, if the second compound includes vinyl functionality, then it is also possible that the second compound is free of all other functionalities other than the vinyl functionality. However, this is not required.

Suitable acrylates for the second compound include, but are not limited to, alkyl acrylates such as methyl acrylate, ethyl acrylate, propyl acrylate, butyl acrylate, hexyl acrylate, ethylhexyl acrylate, stearyl acrylate, lauryl acrylate, other aliphatic and cycloaliphatic acrylates, and combinations thereof. Hydroxyalkyl acrylates like 2-hydroxyethyl acrylate can be used as the second compound so long as the second functionality of the monomer is not isocyanate functionality or another similar functional group that is reactive toward hydroxyl groups under polymerization conditions. Similarly, suitable methacrylates for the second compound include, but are not limited to, alkyl methacrylates such as methyl methacrylate, ethyl methacrylate, propyl methacrylate, butyl methacrylate, hexyl methacrylate, ethylhexyl methacrylate, stearyl methacrylate, lauryl methacrylate, 2-ethylhexyl methacrylate, cyclohexyl methacrylate, other aliphatic and cycloaliphatic methacrylates, and combinations thereof. Hydroxyalkyl methacrylates like 2hydroxyethyl methacrylate can be used as the second compound subject to the conditions outlined above relative to the hydroxyalkyl acrylates. Although not preferred, various acid functional acrylates and methacrylates, such as acrylic acids and methacrylic acids, respectively, can be used as the second compound. Although such acids can be used, they are not preferred because they introduce additional functionality, acid functionality, in addition to vinyl functionality, and it is known that acid functionality can react with epoxy functionality at higher temperatures. More than one second compound may be present in the reaction mixture to form the acrylic composition. Overall, acid, alcohol, and/or amino functionalities for the second compound are generally avoided because these functionalities will react with either the epoxy functionality of the first compound or the second functionality of the monomer, or both.

As an example, if the second functionality of the monomer is isocyanate functionality, the first compound could be a combination of glycidyl acrylates and/or glycidyl methacrylates that are copolymerized with an alkyl acrylate and/or alkyl methacrylate as the second compound. These reactants ensure that the at least one other functional group of the first compound, in this example the epoxy functional group, and the second compound, in this example and alkyl acrylate and/or alkyl methacrylate, do not react with the isocyanate functionality of the monomer under target reaction conditions. Then, if the core molecule includes hydroxyl groups, the isocyanate functionality of the monomer can be made to react preferentially with the hydroxyl groups of the core molecule rather than with the epoxy functionality of the first compound.

The most preferred second compound is methyl methacrylate. For descriptive purposes, a chemical representation of methyl methacrylate is disclosed below.

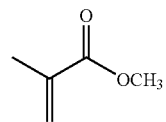

As stated above, the second compound reacts with the monomer and the first compound to form the functionalized intermediate prior to introduction and reaction of the core molecule. Assuming the monomer is α,α-dimethyl isopropenyl benzyl isocyanate, the first compound is glycidyl methacrylate, and the second compound is methyl methacrylate, the functionalized intermediate disclosed below is formed, where INIT. represents the initiator and for practical utility in coating applications, the molecular weight, $M_w$, of the functionalized intermediate, i.e., the functionalized acrylate branches, is controlled to be in the preferred range of 300 to 12,000 for a final acrylic composition having a molecular weight, $M_w$, of 700 to 48,000. With this functionalized intermediate, m and n depend on relative amounts of the first and second compounds.

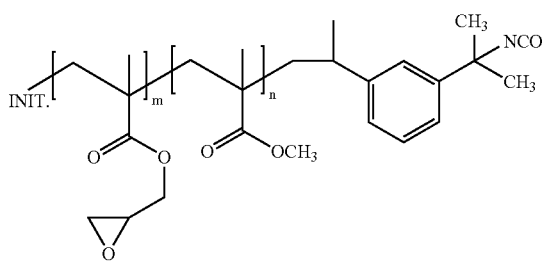

It is to be appreciated that the functionalized intermediate represented above is a random polymer and not a block polymer. Furthermore, it is to be understood that the above functionalized intermediate is merely one example of many different functionalized intermediates that can be formed during the reaction to form the acrylic composition, and the subject invention is not necessarily limited to this particular functionalized intermediate and subsequent derivatives thereof.

Once the functionalized intermediate is formed, the core molecule is introduced to react with the functionalized intermediate to form the acrylic composition of the present invention. The core molecule is selected to provide functionality that is reactive with the second functionality of the monomer. As described above, the core molecule is highly branched and is polyfunctional, i.e., has a functionality greater than or equal to 2. For the purposes of this invention, the terminology highly branched indicates anything that starts with a core and branches in at least two, preferably at least three and more, directions.

Preferred core molecules include polyols that are reactive with the functionalized intermediate to form the acrylic composition and polyamines that are reactive with the functionalized intermediate to form the acrylic composition. However, other potential core molecules could be different than polyols and polyamines and could provide a functionality such as epoxy. In such cases, the preferred second functionality for the monomer would then include carboxylic acid functionality or some other functionality reactive with epoxy.

Polyamines provide amine functional groups. More specifically, polyamines with a centralized core could function as the core molecule and would react with the second functionality of the monomer, in the preferred embodiment isocyanate functionality, to form urea linkages. Polyols provide hydroxyl functional groups and are the most preferred core molecule for use in the present invention. As such, for descriptive purposes only, the remainder of the subject description primarily refers the core molecule as a polyol or polyols. The remaining description, however, is also applicable to other potential core molecules including, but not limited to, the polyamines.

It is not required that the core molecule, preferably the polyol, be branched. Linear polyols such as relatively non-complex diols and triols may be suitable as the polyol although they are less preferred. One example of such a polyol is ethylene glycol. Although extensive branching is not required, it is most preferred that the core molecule, preferably the polyol, is highly branched to achieve desired viscosity benefits. As such, for the purposes of convenience in description, the polyol is hereinafter described in terms of the preferred embodiment, a branched polyol.

Branched polyols are also described in the art as branched compounds that have a plurality of hydroxyl groups. The hydroxyl groups can be primary, secondary, and tertiary hydroxyl groups. In preferred embodiments of the present invention, the branched polyol functions as the core of the star polymer. Therefore, the amount of the branched polyol present in the reaction must be balanced with the amount of the functionalized intermediate, i.e., functionalized acrylate branches, that is formed via the reaction of the monomer and the first compound or via the reaction of the monomer and the first and second compounds. To this end, it is preferred that the molar ratio of the core molecule, preferably the polyol, to the functionalized intermediate is from 1:4 to 1:1. The branched polyol establishes a foundation for the acrylic composition, i.e., the star polymer, which preferably has a highly branched organic structure.

Preferably, the branched polyol is selected from the group of glycerol (glycerin), propylene glycol, erythritol, pentaerythritol, dipentaerythritol, trimethylolethane, trimethylolpropane, dulcitol, threitol, and combinations thereof. Propylene glycol provides two hydroxyl groups, glycerol, trimethylolethane and trimethylolpropane each provide three hydroxyl groups, erythritol, pentaerythritol, and threitol each provide four hydroxyl groups, and dipentaerythritol and dulcitol each provide six hydroxyl groups. Despite these preferred compounds, a wide variety of other branched polyols may be used including, but not limited to, ditrimethylolpropane, tetrakis (2-hydroxyethyl) methane, diglycerol, xylitol, glucitol, sucrose, and other alcohols, sugars, and acids that provide a plurality of hydroxyl groups.

It is to be understood that branched polyols, especially the more complex branched polyols, are frequently referred to as star polyols, and these star polyols are frequently described in different manners. For instance, star polyols can be described as a monomeric polyol containing three or more primary or secondary hydroxyl groups. Alternatively, star polyols can be described as a macromolecule containing a single branch point from which linear chains, or arms, emanate. Star polyols can also be described as a macromolecule containing a constitutional unit from which more than two chains, or arms, emanate.

Preferably, the core molecule is present in an amount of from 0.1 to 20, more preferably from 0.5 to 10, and most preferably from 0.5 to 1.5, parts by weight based on 100 parts by weight of the acrylic composition. In the preferred embodiment of the subject invention, the core molecule is pentaerythritol. For descriptive purposes, a chemical representation of pentaerythritol is disclosed below.

where INIT. represents the initiator and m ranges from 1 to 80, most preferably from 15 to 30.

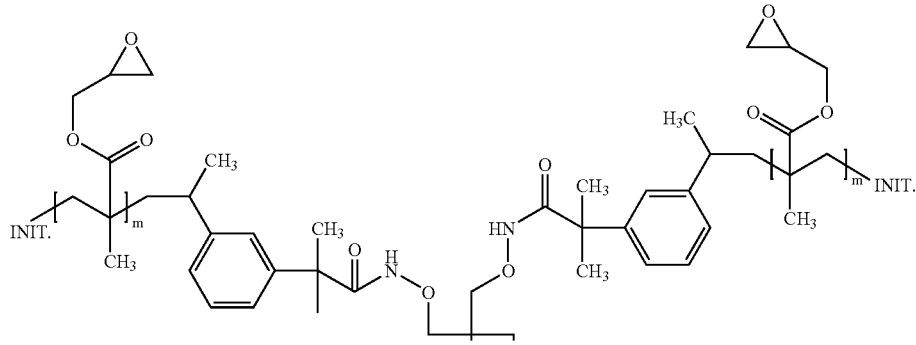

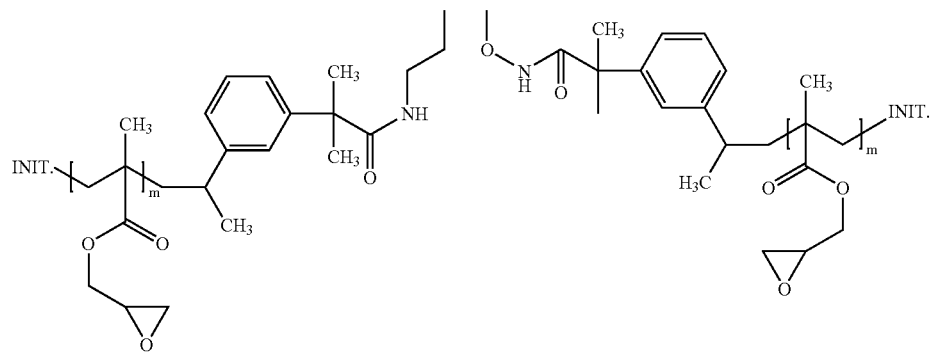

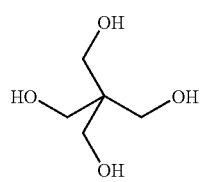

With the core molecule, the complete acrylic composition can now be formed. The core molecule is condensed with the functionalized intermediate, i.e., with the functionalized acrylate branches. More specifically, the core molecule is reacted with the functionalized intermediate to form the star polymer.

Assuming that the monomer is α,α-dimethyl isopropenyl benzyl isocyanate, that the first compound is glycidyl methacrylate, that the second compound is not present, and that the core molecule is pentaerythritol, the complete acrylic composition of the present invention is disclosed below, In a further embodiment of the present invention, the acrylic composition may alternatively be described by the general formula:

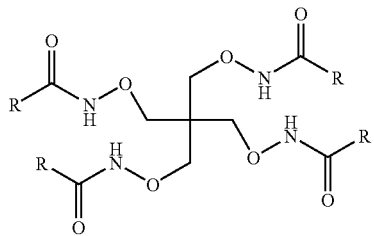

where R comprises a polyacrylate comprising epoxy functionality. In this embodiment, the polyacrylate is the reaction product of the monomer and the first compound, and the first compound includes vinyl functionality and the epoxy functionality. The polyacrylate may also include the second compound as a reactant. In this embodiment, it is clear that the core molecule, i.e., the core, of the star polymer originally provides four hydroxyl groups for reaction with the functionalized acrylate branches. As a result, it is most desirable that there is four times the amount of functionalized acrylate branches present for every equivalent of the core molecule, which is preferably a four-functional polyol.

The acrylic compositions formed herein preferably have a molecular weight, $M_w$, of 700 to 48,000, more preferably of 1,000 to 20,000, and most preferably from 4,000 to 16,000. The steps associated with the acrylic polymerization methods presented herein are conducted at a temperature of from 50° C. to 200° C., more preferably from 110° C. to 160° C.

It is to be understood that all of the preceding chemical representations are merely two-dimensional chemical representations and that the structure of these chemical representations may be other than as indicated.

The following examples illustrating the formation of the acrylic composition of the subject invention, as presented herein, are intended to illustrate and not limit the subject invention.

EXAMPLES

The acrylic composition was formed by adding and reacting the following parts by weight, unless otherwise indicated.

TABLE 1

| Acrylic Composition Component | Amount (grams) | Weight % |
|---|---|---|
| Functionalized, Chain-Stopping Monomer | 10.0 | 4.90 |
| First Compound | 40.0 | 19.62 |
| Second Compound A | 100.0 | 49.05 |
| Second Compound B | 50.0 | 24.52 |
| Initiator (2.0 grams at 10% total monomers by weight) | 2.0 | 0.98 |
| Core Molecule | 1.9 | 0.93 |
| Total | 203.9 | 100.00 |

In Table 1, the Functionalized, Chain-Stopping Monomer is α,α-dimethyl isopropenyl benzyl isocyanate, the First Compound is glycidyl methacrylate, the Second Compound A is methyl methacrylate, the Second Compound B is n-butyl acrylate, the Initiator is TBPO, and the Core Molecule is pentaerythritol.

To form the acrylic composition, 75.0 grams of Solvesso® 100 (also referred to as Aromatic 100) were added into a reactor, and the reactor was heated via a conventional heat supply to a temperature of 150° C. Once the reactor reached 150° C., a mixture of 10.0 grams of the Functionalized, Chain-Stopping Monomer, 40.0 grams of the First Compound, 100.0 grams of the Second Compound A, 50.0 grams of the Second Compound B, and 20.0 grams of the Initiator were added to the reactor over approximately 3 hours to form the functionalized intermediate, i.e., the functionalized acrylate branches.

The functionalized intermediate had a % NCO content of 1.25 (theoretical 1.2%) on solids. The molecular weights and polydispersity of the intermediate were measured using GPC analysis with $M_n$=1970, $M_w$=3370, and the polydispersity=1.7.

Once the functionalized intermediate was formed, the temperature was lowered until the temperature of the functionalized intermediate reached approximately 100–110° C. Then, 1.9 grams of the Core Molecule were added to the reactor along with an additional 11 grams of Solvesso® 100.

A drop of the catalyst, DBTDL, was added and the temperature was held until the % NCO content was measured to be less than 0.1% on solids. The weight per epoxy (WPE) of the acrylic composition was also titrated and determined to be 710 g/epoxy (theoretical 690 g/epoxy). The acrylic composition had a % non-volatile (NV) of 64.4 and, using GPC analysis, the molecular weights and polydispersity of the acrylic composition were $M_n$=2370, $M_w$=5580 and the polydispersity=2.4. The fact that the acrylic composition is star shaped can be discerned because a linear molecule would have a $M_w$=13616 [4×3370 (theoretical molecular weight of the starting acrylic with the monomer)+136 (theoretical molecular weight of pentaerythritol)]. The star, or branched, structure provides a lower molecular weight, $M_w$, by GPC because the molecule is globular instead of linear. Also, the chain stopping ability of the monomer that is chosen can be discerned by the fact that reaction of the functionalized intermediate (with only one NCO functional chain end) with the Core Molecule did not produce a gelled product. Notably, a polyfunctional NCO as opposed to only one NCO functional chain end would have resulted in an insoluble gelling if it were to react with the Core Molecule, such as the pentaerythritol.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. An acrylic composition for use in a coating composition, said acrylic composition comprising the reaction product of:
   a functionalized, chain-stopping monomer;
   a first compound reactive with said monomer to form a functionalized intermediate, said first compound comprising vinyl functionality reactive with said monomer and at least one other functionality different from said vinyl functionality;
   a highly-branched, polyfunctional core molecule reactive wit said functionalized intermediate to form said acrylic composition.

2. An acrylic composition as set forth in claim 1, wherein said monomer comprises a first monomer functionality and a second monomer functionality.

3. An acrylic composition as set forth in claim 2, wherein said first monomer functionality of said monomer comprises vinyl functionality.

4. An acrylic composition as set forth in claim 3, wherein said second monomer functionality of said monomer comprises hydroxyl-reactive functionality.

5. An acrylic composition as set forth in claim 4 wherein said hydroxyl-reactive functionality comprises isocyanate functionality.

6. An acrylic composition as set forth in claim 5 wherein said isocyanate functionality comprises aliphatic isocyanate functionality.

7. An acrylic composition as set forth in claim 6 wherein said monomer comprises a,a-dimethyl isopropenyl benzyl isocyanate.

8. An acrylic composition as set forth in claim 1 wherein said monomer is selected from the group of functionalized styrene functionalized a-methylstyrene;
   functionalized diphenylethylene, functionalized dinapthalenethylene, and combinations thereof.

9. An acrylic composition as set forth in claim 1 wherein said at least one other functionality of said first compound is non-reactive with said monomer and said core molecule.

10. An acrylic composition as set forth in claim 1 wherein said at least one other functionality of said first compound comprises epoxy functionality.

11. An acrylic composition as set forth in claim 1 wherein said first compound is selected from the group of acrylates having epoxy functionality in the alkyl chain, methacrylates having epoxy functionality in the alkyl chain, and combinations thereof.

12. An acrylic composition as set forth in claim 1 wherein said first compound is selected from the group of glycidyl acrylate, glycidyl methacrylate, and combinations thereof.

13. An acrylic composition as set forth in claim 1 further comprising a second compound reactive with said monomer and said first compound to form said functionalized intermediate.

14. An acrylic composition as set forth in claim 13 wherein said second compound comprises vinyl functionality.

15. An acrylic composition as set forth in claim 14 wherein said second compound is free of functionality other than said vinyl functionality.

16. An acrylic composition as set forth in claim 14 wherein said second compound is selected from the group of acrylates, methacrylates, acrylonitriles, styrenes, and combinations thereof.

17. An acrylic composition as set forth in claim 1 wherein said core molecule comprises a polyol reactive with said functionalized intermediate to form said acrylic composition.

18. An acrylic composition as set forth in claim 17 wherein said polyol is selected from the group of glycerol, propylene glycol. erythritol, pentaerythritol, dipentaerythritol, trimethylolethane, trimethylolpropane, dulcitol, threitol, and combinations thereof.

19. An acrylic composition as set forth in claim 1 wherein said core molecule comprises a polyamine reactive with said functionalized intermediate to form said acrylic composition.

20. An acrylic composition as set forth in claim 1 wherein said acrylic composition further comprises the reaction product of an initiator selected from the group of inorganic persulfates, dialkyl peroxides, hydroperoxides, peresters, azo compounds, and combinations thereof.

21. An acrylic composition as set forth in claim 1 wherein said acrylic composition has a molecular weight, $M_w$, of 700 to 48,000.

22. An acrylic composition as set forth in claim 1 wherein said monomer is present in an amount of from 1 to 20 parts by weight based on 100 part by weight of said acrylic composition.

23. An acrylic composition as set forth in claim 1 wherein said first compound is present in an amount of from 10 to 99 parts by weight based on 100 parts by weight of said acrylic composition.

24. An acrylic composition as set forth in claim 1 wherein said core molecule is present in an amount of from 0.1 to 20 parts by weight based on 100 parts by weight of said acrylic composition.

25. An acrylic composition as set forth in claim 1 wherein said monomer comprises α,α-dimethyl isopropenyl benzyl isocyanate, said first compound comprises glycidyl acrylate or glycidyl methacrylate, and said core molecule comprises pentaerythritol.

26. An acrylic composition of the general formula:

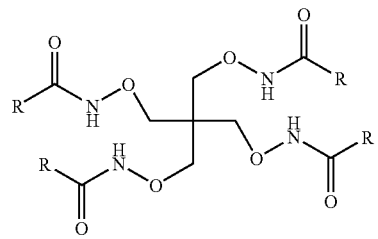

where R comprises a polyacrylate comprising epoxy functionality.

27. An acrylic composition as set forth in claim 24 wherein said polyacrylate comprises the reaction product of:
a functionalized, chain-stopping monomer; and
a first compound reactive with said monomer and comprising vinyl functionality reactive with said monomer and said epoxy functionality.

28. An acrylic composition as set forth in claim 27 wherein said polyacrylate further comprises the reaction product of a second compound reactive with said monomer and said first compound.

29. An acrylic composition as set forth in claim 27 wherein said monomer comprises vinyl functionality and hydroxyl-reactive functionality.

30. An acrylic composition as set forth in claim 29 wherein said monomer comprises α,α-dimethyl isopropenyl benzyl isocyanate.

31. An acrylic composition as set forth in claim 27 wherein said first compound is selected from the group of acrylates having epoxy functionality in the alkyl chain, methacrylates having epoxy functionality in the alkyl chain, and combinations thereof.

32. An acrylic composition as set forth in claim 27 wherein said first compound is selected from the group of glycidyl acrylate, glycidyl methacrylate, and combinations, thereof.

33. An acrylic composition as set forth in claim 28 wherein said second compound is selected from the group of acrylates, methacrylates, acrylonitriles, Styrenes, and combinations thereof.

* * * * *